(No Model.)

R. EDLIN.
WHEEL TIRE.

No. 486,191. Patented Nov. 15, 1892.

Witnesses:
Alex Stewart
A. Kelly

Inventor:
Robert Edlin
by Church & Church,
His Attys.

THE NORRIS PETERS CO., PHOTO-LITHO., WASHINGTON, D. C.

UNITED STATES PATENT OFFICE.

ROBERT EDLIN, OF LEICESTER, ENGLAND.

WHEEL-TIRE.

SPECIFICATION forming part of Letters Patent No. 486,191, dated November 15, 1892.

Application filed June 23, 1892. Serial No. 437,805. (No model.)

*To all whom it may concern:*

Be it known that I, ROBERT EDLIN, a subject of the Queen of England, residing at Leicester, England, have invented certain new and useful Improvements in Wheel-Tires, of which the following is a specification.

This invention relates to tires for wheels, and has special reference to what are known as "pneumatic tires."

The object of the invention is to produce a pneumatic tire—*i. e.*, a tire filled with compressed air or gas—so that should the air tube or chamber become punctured or otherwise injured it may be possible to withdraw or remove it for repairing without it being necessary also to remove the whole of the tire or the outer protective covering, as is requisite with pneumatic tires as at present constructed.

The invention will be fully understood from the following description in reference to the accompanying drawings, in which—

Figure 1:
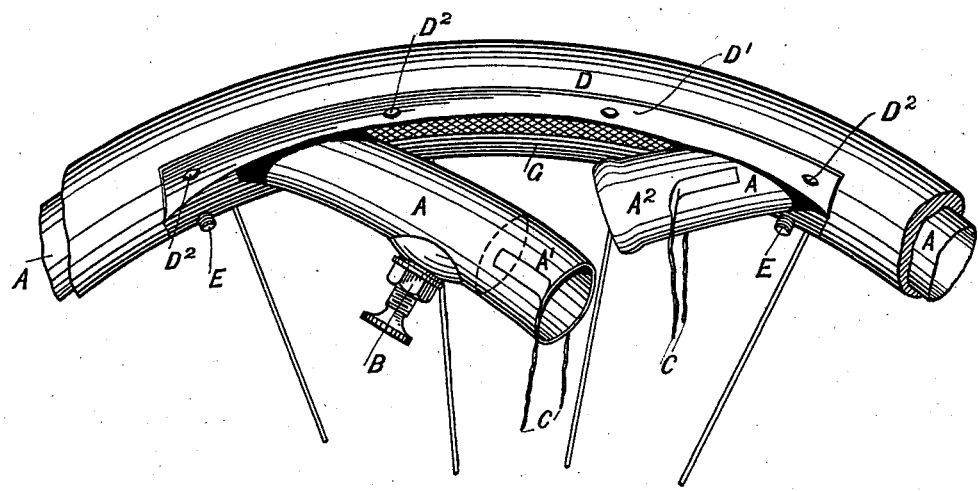
Figure 3:
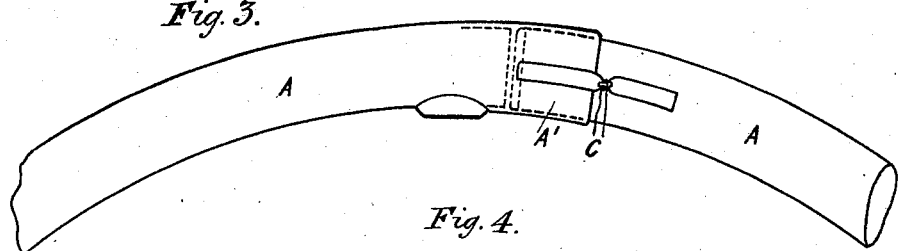
Figure 4:
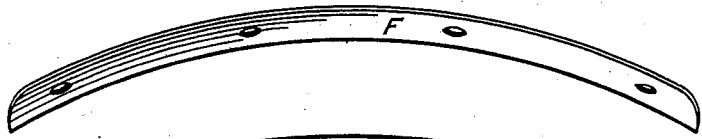
Figure 2:
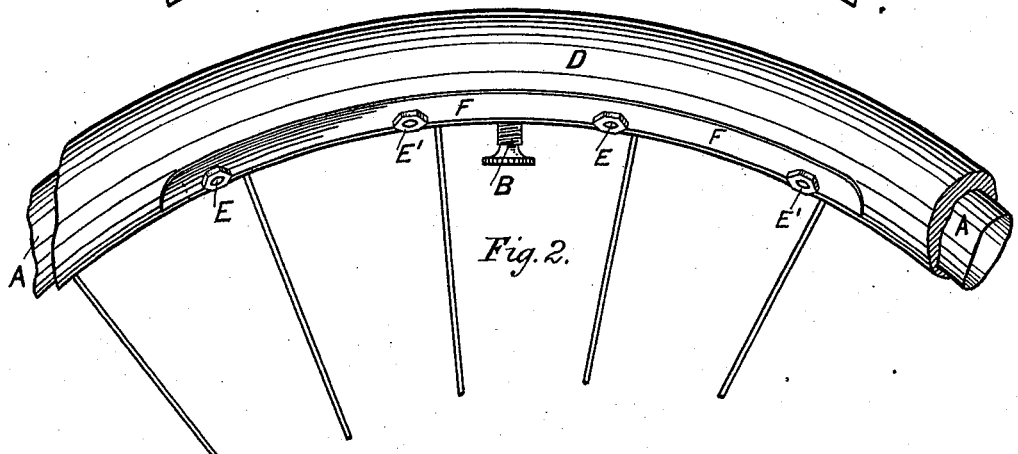

Figure 1 is an elevation of a portion of a wheel-tire constructed in accordance with this invention, the flap of the outer protective covering being turned back and the ends of the air-tube projecting. Fig. 2 is a view of a portion of the tire complete and as fitted on a wheel ready for use. Fig. 3 is a view of a portion of the air-tube, showing one end within the extension of the other end and tied together. Fig. 4 is a detached view of the flap-covering plate.

A represents the air-tube, which is filled with air under compression through any convenient form of valve B by an inflater or air-pump in the well-known manner. The air-tube, instead of being made and vulcanized in an entire unbroken circle, is formed of a length of rubber tubing according to the circumference of the wheel, the ends being closed or stopped up. One end A' is provided with a sleeve or tubular extension, into which the other end A² is received. The two ends may then be tied together by cords or tapes C, or equivalent means, cemented and vulcanized or otherwise secured to the sides of the air-tube, as indicated in Figs. 1 and 3.

The air-tube is secured in position on the rim of the wheel by an outer covering D of india-rubber and canvas of the usual construction and such as is referred to in the specification of Dunlop's British patent No. 4,116 of 1889, with the exception that instead of the whole of the sides or edges being cemented to the inner face of the wheel-rim a portion of one of the sides or edges, constituting a flap D', is left loose, so as to admit of the air-tube being withdrawn, as hereinafter described. This flap by preference is ten inches in length, or thereabout, and is provided with a series of marginal perforations D², which when the air-tube is fixed in proper position on the wheel-rim for being inflated and connected together, as in Fig. 3, are placed over a similar number of screw-threaded studs E or equivalents, projecting from the inner face of the rim toward the center of the wheel. A plate F, shaped to the rim of the wheel (shown detached in Fig. 4) and provided with an identical number of holes, is then placed over the studs E and the flap D', and the whole are then firmly secured together by nuts E' being tightened over the screw-threaded studs E. Other means than the nuts may be employed to fix the plate in position over the flap D', and it is obvious that there may be more than one flap, if desired—*i. e.*, two or more shorter flaps may be employed. Now suppose the air-tube having become punctured, it is desired to remove it from the wheel for repairs, the procedure is as follows: The nuts E' are first unscrewed and the plate F lifted off the studs E and removed. The flap D' is next also disconnected from the studs E and turned back, the valve B pressed through the usual opening in the rim G, the strings C on the ends of the air-tube A unfastened, and the ends of the latter will then be free, as in Fig. 1. A cord should now be tied to the end A² of the air-tube A. Then by taking hold of the opposite or valve end of the latter the tube can be drawn round the circumference of the wheel and within the external covering D until it is entirely removed from the wheel or so far removed as to show the punctured portion, when it is free to be repaired. The length of the cord which is fastened to the end A² of the air-tube should be at least one and a half times that of the circumference of the wheel, and when the air-tube is wholly withdrawn, as described, it will be found a convenient method to adopt to tie the end of such cord either to one of the wheel-spokes or to an object larger than the entrance allowed by the flap. This will prevent the end of cord passing into the outer covering and following the air-tube in its removal.

Upon the repair of the air-tube being effected and the cord hereinbefore mentioned being pulled taut the air-tube will follow it round the circumference of the wheel and within the outer covering until the ends bear approximately the relative positions indicated in Fig. 1, when the complete tire can be secured to the wheel in the manner hereinbefore mentioned.

I claim—

1. The combination, with the tube forming the air-receptacle of a pneumatic tire, having a lateral filling-orifice and closed ends, of a tubular extension on one of said ends forming a sheath for the opposite end and fastenings for securing said tubular extension or sheath and its inclosed end together, substantially as described.

2. In a pneumatic tire, the combination, with the outer covering or wearing portion having an opening therein closed by a flap, of an inner air-tube having closed ends, one of said ends having a tubular extension forming a sheath for the opposite end, and flexible connections on said sheath and end inclosed thereby for holding the sheath and end in proper relative position, substantially as described.

3. A pneumatic tire for vehicle-wheels, consisting of an air-tube having closed ends, one end having a tubular extension into which the opposite end is received and tied thereto, an outer covering formed with one or more flaps provided with a series of marginal perforations adapted to fit over a similar number of studs on the wheel-rim, a metal plate, also perforated to fit over the said studs and be secured thereon by nuts or equivalent means, substantially in the manner described, and illustrated in the accompanying drawings.

In testimony whereof I have hereunto set my hand in the presence of the two subscribing witnesses.

ROBERT EDLIN.

Witnesses:
　E. NORTH LEWIS,
　GEO. H. SHOULER,
*Both of Buridge Street Chambers, Leicester.*